A. M. STOCKING.
APPLIANCE FOR SUPPORTING COOKING UTENSILS.
APPLICATION FILED APR. 26, 1912.
1,112,574.
Patented Oct. 6, 1914.
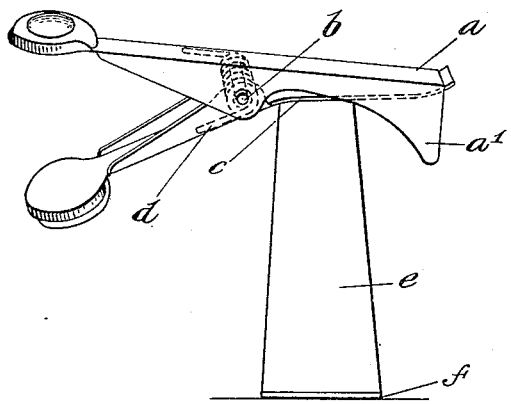
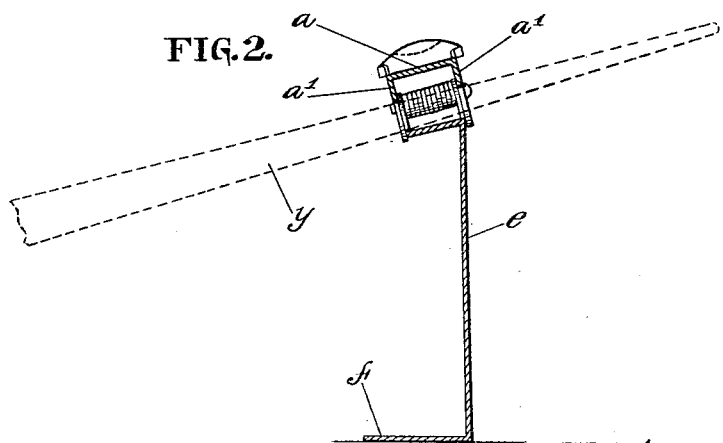
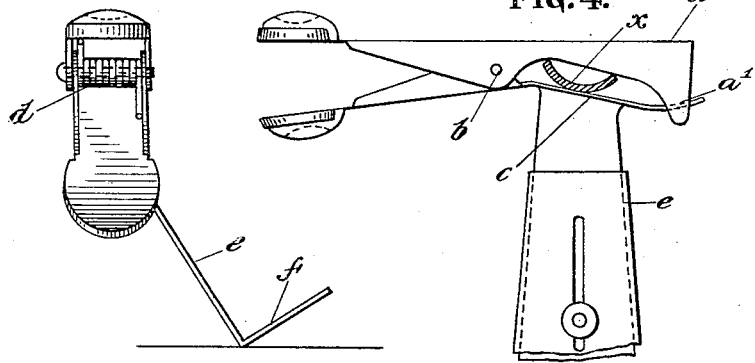
Witnesses:
C. S. Ashley
J. J. Donohue
Inventor
Amy M. Stocking
By her Attorney
Edward C. Davidson

UNITED STATES PATENT OFFICE.

AMY M. STOCKING, OF EAST ORANGE, NEW JERSEY.

APPLIANCE FOR SUPPORTING COOKING UTENSILS.

1,112,574.  Specification of Letters Patent.  Patented Oct. 6, 1914.

Application filed April 26, 1912. Serial No. 693,333.

*To all whom it may concern:*

Be it known that I, AMY M. STOCKING, a citizen of the United States, residing in East Orange, county of Essex, State of New Jersey, have invented a certain new and useful Improved Appliance for Supporting Cooking Utensils, of which the following is a specification.

This invention comprises a simple inexpensive device by the use of which sauce pans and other cooking utensils may be held upon the stove or heater either level or angularly as may be desired. It admits of instantaneous adjustment, thereby preventing the upsetting of boiling fluid or fat over the stove or operator.

In the accompanying drawing: Figure 1 is a side elevation of the device, showing the closing spring of the jaws in dotted lines; Fig. 2 is a vertical transverse section, showing the jaws gripping or holding an irregular shaped or taper handle of a sauce pan, the device being in vertical position; Fig. 3 is an end view looking at the front or finger-piece end of the device; and Fig. 4, a detail side elevation showing in section the handle of a utensil grasped by the holding jaws.

The device comprises a spring clip which may be most conveniently and inexpensively made of sheet metal and is composed of two jaws $a$, $c$, the upper jaw $a$ being pivoted upon a pivot bolt $b$ which has its bearings in flanges at the edges of the upper and lower jaws. Around the bolt is applied a coiled re-action spring $d$ which tends to close the upper jaw down upon the lower one. The upper jaw is preferably straight, or substantially so, and at its outer end has side flanges $a'$, $a'$, which, when the jaw is thrown down by its spring, embrace the edges of the outer end of the lower jaw. The edges of these flanges are preferably curved upwardly and toward the pivot $b$ where they merge into the flange in which the pivot bolt has its bearing. This is for the purpose of enabling the jaw to take a firm grip upon sauce pan handles of different dimensions and shapes. As shown at Fig. 4, three points of contact are provided, adapted by proper adjustment to firmly hold a handle $x$. In Fig. 2 a tapered handle $y$ is shown in dotted lines. The lower jaw preferably extends rearwardly horizontally, or substantially so, from a point adjacent the pivot $b$ and the front portion or finger piece end inclines downwardly as shown. Between the pivot and the outer end of the lower jaw, there is an integral standard $e$ that extends downwardly and has a foot or base $f$ formed by bending the metal at right angles to the standard. The finger pieces of the jaws are preferably concaved to afford a firm grip of the fingers thereon, and when the finger piece of the upper jaw is pressed downwardly the rear end rises sufficiently to permit the introduction laterally of the utensil handle which is spring held by this jaw when it is released. By adjusting the clip endwise of the handle, the handle will be held by the standard at any desired elevation so as to maintain the sauce pan, or other utensil, with its bottom level or at any desired angle whether the utensil be on the flat top of the stove or resting over or in a stove hole or upon the heating grid of a gas stove.

The standard $e$ instead of being at right angles to the pivot axis $b$ may be bent or inclined in either direction, if desired, and the supporting clip may be applied to the handle of a utensil either from the right or left hand side, thus providing for various elevations of the gripping parts of the device to hold at any desired angle all kinds of sauce pans and frying pans.

Fig. 4 shows the manner in which the jaws, when shaped as shown will grasp a handle at three points.

The device above described may be applied to the handle of a sauce pan, frying pan or similar utensil without the necessity of touching the handle.

The base or foot extends in one direction only from the standard and the opposite side of the device is substantially flat. It may, therefore, be conveniently used to hold up the handle of a frying pan or sauce pan by placing the flat side on the stove and pushing the now vertically disposed base under the handle of the utensil at the desired point to hold it flat or at such angular declination as may be desired.

The few examples of use of this device given suffices to demonstrate the utility of the invention. Numerous other applications of it will be obvious.

In Fig. 4 the standard is shown as adjustably extensible, being made of telescoping parts and provided with a set screw.

I claim:

1. A support for sauce pans and similar utensils comprising a clip adapted to engage any part of the handle of the utensil laterally thereof and a standard extending downwardly from the handle grasping portion of the clip whereby by adjusting the clip along the handle of the utensil its body portion may be held either level or in an angular position as may be desired.

2. A supporting device for sauce pans and similar utensils comprising two jaws pivoted together, a spring the reaction of which tends to close the jaws whereby the device may be applied laterally to any part of the handle of the utensil, a standard extending downwardly from the handle grasping portion of the device and a laterally extending base piece at the bottom of the standard.

3. A supporting device for sauce pans and similar utensils comprising two jaws pivoted together adapted to laterally engage any part of the handle of the utensil, the upper one of which is movable upon the lower one and is substantially straight and the lower one of which inclines downwardly in front of the pivot and extends substantially horizontally in rear of the pivot, flanges on the upper horizontal jaw that embrace the edges of the rear part of the lower angular jaw and a standard extending downwardly from the lower angular jaw in rear of the pivot and formed with a laterally extending base.

4. A support for sauce pans and similar utensils comprising a clip adapted to engage any part of the handle of a utensil laterally thereof and a standard extending downwardly from the handle grasping portion of the clip said standard and the grasping portion being transversely arranged at an acute angle, whereby by applying the clip at the right or left hand side of the handles of utensils of different sizes and heights said utensils may be securely held in desired positions.

5. A supporting device for sauce pans and similar utensils comprising two jaws pivoted together, a spring the reaction of which tends to close the jaws whereby the device may be applied laterally to any part of the handle of the utensil, an extensible standard extending downwardly from the handle grasping portion of the device and a laterally extending base piece at the bottom of the standard.

In testimony whereof, I have hereunto subscribed my name.

AMY M. STOCKING.

Witnesses:
L. L. BROWNING,
M. L. SMITH.

Copies of this patent may be obtained for five cents each, by addressing the "Commissioner of Patents, Washington, D. C."